United States Patent

Havlik

[15] 3,642,403

[45] Feb. 15, 1972

[54] INJECTION MOLDING MACHINE

[72] Inventor: Jaroslav J. Havlik, P.O. Box 430, Preston, Ontario, Canada

[22] Filed: June 2, 1969

[21] Appl. No.: 839,765

Related U.S. Application Data

[63] Continuation-in-part of Ser. No. 672,232, Oct. 2, 1967, abandoned.

[52] U.S. Cl..............................425/145, 425/245, 425/257
[51] Int. Cl. .........................................................B29f 1/06
[58] Field of Search............18/30 AA, 30 AC, 30 AF, 30 AH, 18/30 AP, 30 AK, 30 AS, 30 AM, 30 LA, 30 LC, 30 LB, 30 LD, 30 LE, 30 LF, 30 LT, 30 LV

[56] References Cited

UNITED STATES PATENTS 3,345,691  10/1967  Aoki..........................................18/30
3,516,123  6/1970  Lang et al..................................18/30

Primary Examiner—J. Spencer Overholser
Assistant Examiner—Lucius R. Frye
Attorney—George H. Riches

[57] ABSTRACT

An injection molding machine which uses hydraulic pressure fluid for a. opening and closing the platens which carry the mold cavity, b. continuously driving the plasticizer screw which incorporates an automatic cutoff, c. actuating the injection plunger.

The platens are opened and closed without pressure by means of a high-speed low-volume hydraulic actuator. The high pressure required for mold clamping is applied hydraulically after the platens close and the pressure is released before the platens open. The mold opening and closing is accomplished at high speeds, so that cycle speeds are largely dependent on the solidification time of the injected material. Thin-walled plastic cups for example, may be produced at a rate of about 30 per minute with single-cavity mold. The cycle may be initiated either manually, or automatically with a simple electrically operating timing system which actuates the hydraulic system.

The mold clamping pressure can be regulated and varied while the machine is operating. The injection nozzle can be adjusted through 360° relative to the sprue channel in the platens and this can be done with the machine in operation.

The measured amount of plasticized material which can be injected into the die at each stroke of the injection piston can be altered while the machine is running. This makes it possible to quickly calibrate the machine to the requirements of each article being molded.

13 Claims, 18 Drawing Figures

INVENTOR.
JAROSLAV J. HAVLIK
BY
ATTORNEY

INVENTOR
JAROSLAV J. HAVLIK
BY George Ruhe
ATTORNEY

Inventor
JAROSLAV J. HAVLIK
By
George ...
Attorney

INJECTION MOLDING MACHINE

This application is a continuation-in-part of my application Ser. No. 672,232 filed on Oct. 2, 1967, now abandoned.

BACKGROUND OF THE INVENTION

Many present injection molding machines used in the field of making plastic articles have been designed to use electric motors and the necessary controls. One of the pioneers in this field has been Battenfeld Maschinenfabriken GmbH, Meinerzhagen/Westphalia, Germany. An injection molding machine which constitutes an improvement on the Battenfeld machines is disclosed in Canadian Pat. No. 693,215 dated Aug. 24, 1964 and its U.S. counterpart U.S. Pat. No. 3,117,348 dated Jan. 14, 1964 to Robert Schad, assignee of Herbert Rees.

The injection molding machine illustrated in that patent was designed for high-speed operation. However, it requires complex electrical circuits and numerous limit switches which control the "continuously reciprocable piston," the opening and closing of the platens and ejection of the finished article. These appear to be an essential feature of that invention. The platens close under high molding pressure. This requires exceedingly close setup tolerances, careful adjustment of electrical safety circuits and massive components to prevent severe damage to the mold or machine during the occasional cycle malfunction. For example, an incompletely ejected part will prevent mold closing, a condition which cannot be sensed soon enough to easily dissipate potentially damaging inertial forces. The claims of the Rees patent indicate the complexity of the wiring circuits which naturally results. Similarly, the mechanical injection drive must be massively constructed to obviate failure due to shock, even when the shock is reduced by any of several cushioning methods. The net result is a high cost machine with an intricate mechanism.

The present application solves some of the problems inherent in the prior injection molding machines by employing hydraulic energy for the following functions:

a. opening and closing the platens freed of the high pressure necessary for the molding step with an hydraulically driven rotor.

b. hydraulically applying the necessary high clamping pressure a moment after the platen is closed and releasing that pressure at the end of the molding step and just before the mold is opened for the ejection of the article.

c. an injection piston mounted in an injection cylinder said injection being hydraulically actuated to force a charge of plasticized material into a mold carried by the platens.

d. adjustment of the amount (measuring) of the plasticized material to be injected at each stroke of the piston while the machine is running—that is, it is not necessary to stop the machine to make such an adjustment.

e. adjustment of the clamping pressure while the machine is running.

f. a nozzle adjustment which permits the orientation of the nozzle tip through 360° to ensure its correct alignment with the sprue inlet in the fixed platen.

g. an hydraulic motor which drives the screw for injecting plasticized material into the injection cylinder.

h. a feed screw driven by the motor, said screw being responsive to the pressure between the injection cylinder and the hydraulic fluid pressure driving the motor to move in a longitudinal direction to automatically shut off the supply of pressurized hydraulical fluid to the hydraulic motor when the injection cylinder has a full load of plasticized material and to move in the opposite direction to open said supply to the motor when additional material is required.

i. a timing mechanism which controls a series of solenoid valves in the hydraulic conduit system to carry out the conventional sequence of operation to mold articles.

The machine of the present invention is simple in construction and operation, and removes the complexities of the present machines.

DESCRIPTION OF THE INVENTION

The accompanying drawings illustrate the construction of a preferred embodiment of the invention. In the drawings.

The injection molding machine shown in the drawings has many conventional parts which are generally known in the field to which the invention pertains and they will not be described in detail. The machine shown in the drawings may be divided generally into:

a. a base and frame work which consists of a base 20, four tie rods 21 regularly spaced and arranged in a conventional manner and suitably supported from b. a clamp end assembly which will be described in detail. In general terms it includes the movable platen and the associated apparatus for reciprocating it between open and closed positions and to clamp the same against the stationary platen to carry out the article forming process. The clamp end assembly includes a novel mounting whereby clamping pressure is applied after the platens and mold have been closed for the molding step.

c. an injection assembly which comprises a fixed platen, an injection cylinder, injection plunger, a feed screw and related parts.

d. an hydraulically actuated rotor and an hydraulic motor for respectively actuating the movable platen and driving the preplasticizer screw.

e. the necessary hydraulic conduit system and controls, the hydraulic system containing a novel means for stopping the hydraulic motor when the injection cylinder has a full charge of plasticized material.

There are also means for a. adjusting the amount of the charge.

b. adjustments for truing the platens and the molds.

c. the fine adjustment of platen closing.

The following is the description of the machine and it starts with the clamp end assembly.

CLAMP END ASSEMBLY

The clamp end assembly is illustrated in FIGS. 1, 2, 3, 4, 5, 6, 7 an 8. Referring first to the drawings which illustrate the complete assembly of the machine, namely FIGS. 1, 2 and 3, the clamp end assembly, moving leftward to the left-hand end comprises the movable platen at 23 which is slidably mounted on the tie rods 21 in the usual manner; a rearwardly extending connecting member 24 which has its right-hand end connected to the platen and its left-hand end slidably mounted on the tie rods by means of bearings 25. The connecting member 24 is formed with rearwardly extending spaced apart arms 26, 27, 28 in which is journaled a pivot pin 29. Crank arms 30, 31 have their right-hand ends pivotally connected to the brackets 26, 27, 28 respectively and their left-hand ends connected to a rotor assembly which will now be described.

Figure 2:
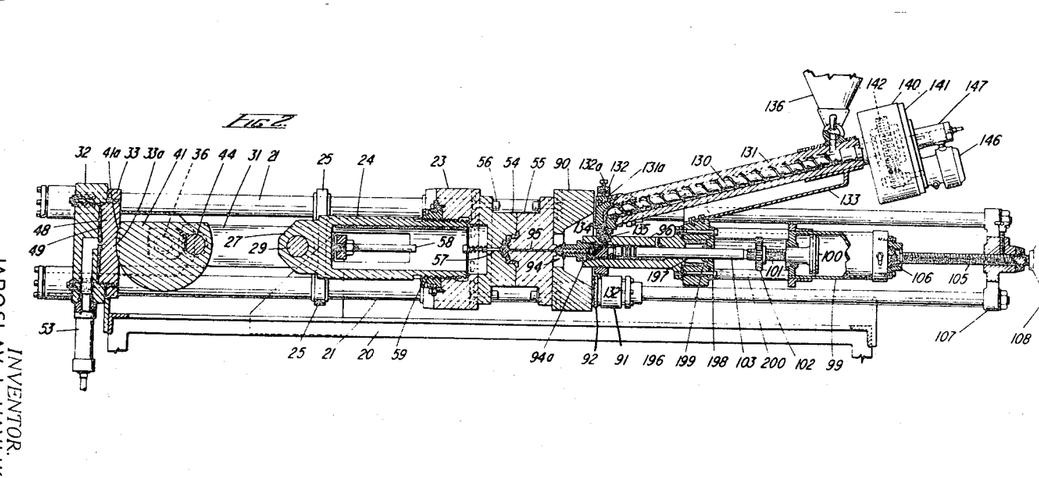
FIG. 2 is a vertical cross section of the machine shown in FIG. 1 taken through the longitudinal axis of the machine.
Figure 3:
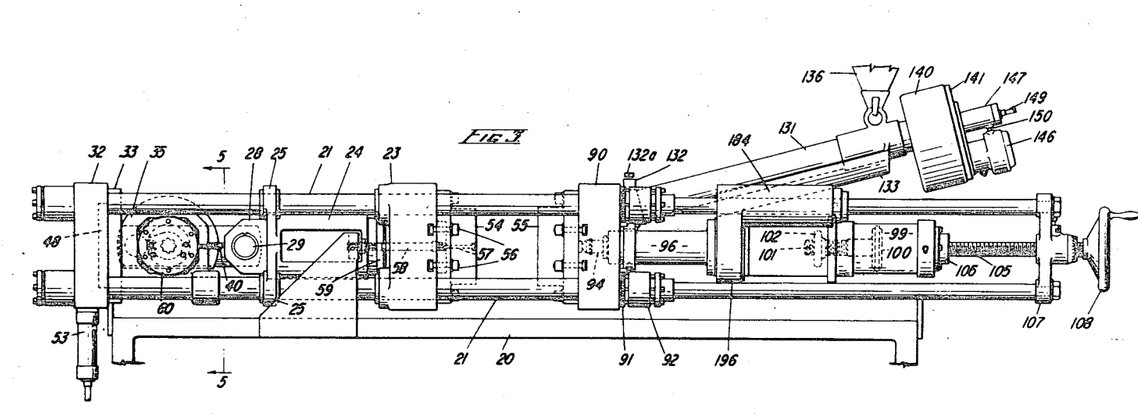
FIG. 3 is a longitudinal side elevation of the machine shown in FIGS. 1 and 2.
Figure 4:
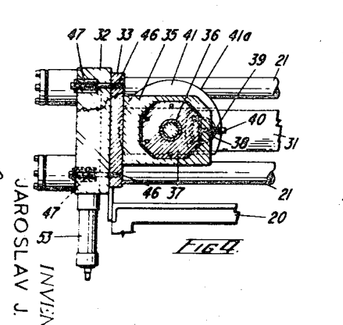
FIG. 4 is a cross section generally on the line 4—4 of FIG. 1.

The rotor assembly is shown in FIGS. 1, 2, 3, 4, 5, 6, 7 and 8. The rotor assembly comprises a fixed base 32 appropriately mounted on the frame at the left-hand end thereof, and a hydraulically actuated base 33 slidably mounted on the tie rods 21 for limited reciprocating motion; a pair of support arms 34, 35 which have rotatably mounted therein a shaft 36. The manner of mounting the shaft is shown in FIG. 4 which is a cross section on the line 44 of FIG. 1. It will be seen on referring to FIG. 4 that a bearing block 37 is slidably mounted in the arm 35. The bearing block 37 is held in its prescribed position by a screw 38 which slidably passes through the front end of the arm 35. A compression spring 39 is captured between the screw head 40 and the front end of the arm 35. The tension of the spring 39 can be adjusted so that the bearing block 37 will work against the proper force. The other arm 34 has a similar arrangement of elements. By means of this structure the shaft 36 is mounted in a resilient manner to protect it against damage by deflections which occur when applying the heavy mold clamping force.

A part-cylindrical crank element 41 is mounted concentrically on the shaft 36 in driving connection therewith. Extending through the crank element 41, eccentrically relative to the axis thereof, is a crankpin 44 by means of which the left-hand end of the crank arms 30, 31 are connected to the crank element 41. The crank element 41 is adapted to receive the ends of the crank arms 30, 31 in slots 42, 43. Part of the cylindrical surface 41a of the crank element 41 is adapted to bear against a corresponding curved face 33a of the hydraulically actuated base 33 in the closed and clamped position of the platen 23.

HYDRAULICALLY ACTUATED BASE

Figure 5:
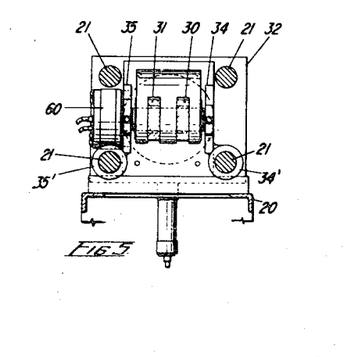
FIG. 5 is a cross section on the line 5—5 of FIG. 3.

Referring now to the hydraulically actuated base 33 its construction is clearly shown in FIGS. 2, 4 and 5. It will be seen in referring to these figures that the base 33 is provided with four mounting pins, with one of each pins adjacent one of the corners of the base. The pins 46 slidably extend through the fixed base 32. Each pin is provided with a compression spring 47, the spring 47 acting to hold the base 33 against base 32. The base 33 is formed with a cylindrical extension 48 which fits into a matching recess 49 formed in the fixed base 32. An O-ring forms a seal between the extension 48 and the wall of the recess 49. The fixed base 32 is formed with a fluid conduit 51 which communicates with the chamber formed by the extension 48 and recess 49. Hydraulic fluid under pressure is admitted to and released from the chamber 52 formed by the extension 48 and recess 49 through the hydraulic system generally indicated at 53 and which will be more particularly described hereafter.

The arms 34 and 35 form a part of the base assembly 33 and each arm 34, 35 is provided with a bearing portion 34', 35' which is slidable on a lower tie rod 21 to help guide and align the extension 48 in the recess 49.

There is mounted on the front of the movable platen 23 one half of a mold cavity indicated by the numeral 54; the other half being indicated by the numeral 55 but which is mounted on the fixed platen to be hereinafter described. The mold cavity 54 is mounted on the movable platen 23 by means of mounting bolts 56. The movable platen also carries the conventional knockout pin 57 which on the opening stroke of the platen moves rearwardly with the platen and strokes the pin 58 which is mounted on the frame to thus eject the molded article. The movable platen is provided with a means for fine platen closing adjustment which means consist of a ring 59 which is rotatably mounted on the connecting member 24 so that by rotating the ring the platen can be brought to its correct closing position and the ring blocked in that position.

DRIVE MECHANISM

Figure 1:
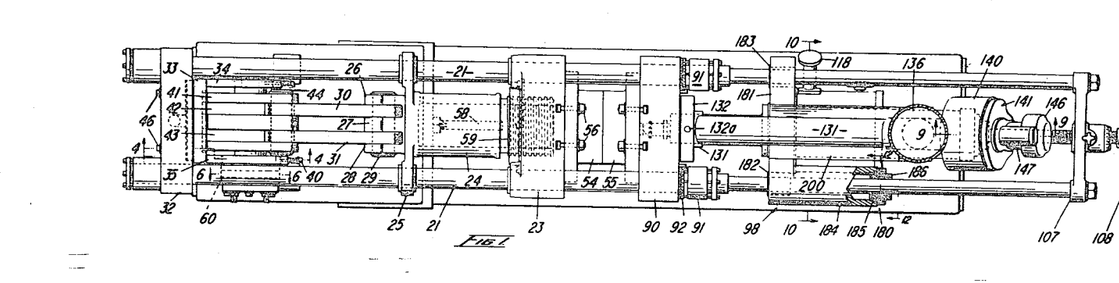
FIG. 1 is a plan view of the invention.
Figure 6:
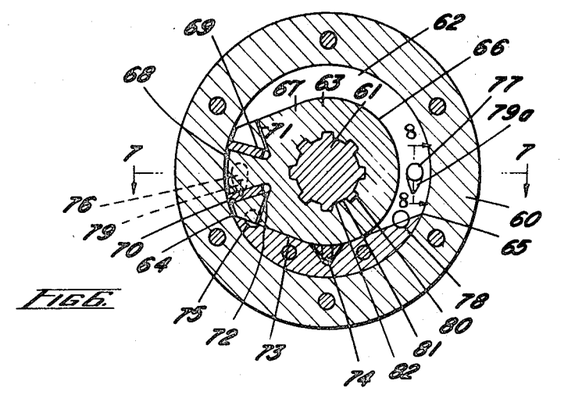
FIG. 6 is a cross section of the rotor assembly taken on the line 6—6 of FIG. 1.
Figure 7:
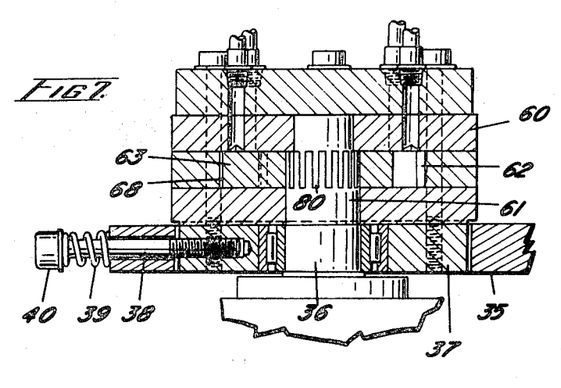
FIG. 7 is a cross section of the rotor assembly taken on the line 7—7 of FIG. 6.
Figure 8:
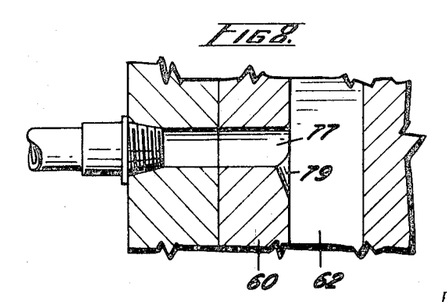
FIG. 8 is a cross section of the rotor assembly taken on the line 8—8 of FIG. 6.

The mechanism for oscillating the shaft 36 consists of a hydraulic rotor which is illustrated in FIGS. 1 and 2 in its assembled position on the molding machine and in detail in FIGS. 6, 7, and 8. The hydraulic rotor comprises a rotor housing 60 which is mounted on the bearing blocks 37 with the extension 61 of the shaft 36 extending axially up a fluid chamber 62 formed by the housing 60. Mounted on the shaft extension 61 within the chamber 62 is an hydraulically actuated oscillating rotor 63 which is oscillatable between two substantially diametrically opposite terminal positions, the terminal positions being indicated by the numerals 64, 65. The rotor 63 is smaller in diameter than the chamber 62 with substantially one half of its periphery of circular contour as indicated at 66 with the other side or half defined as a lobe as shown at 67, the lobe 67 having an arcuate face 68 corresponding to the contour of the wall of the fluid chamber 62. The lobe is provided with a pair of radial spaced-apart sealing vanes 69, 70 which are forced into intimate contact with the inside wall of the chamber by means of hydraulic pressure admitted to the inner ends of each of the vanes through a fluid conduit 71, 72 respectively. One portion of the wall of the chamber 62 is built up as shown at 73, the built-up portion being extended to the terminal points 64, 65. Centrally of the built-up portion is a sealing vane 74 to prevent the leakage of hydraulic fluid between the rotor and the built up portion 73. It will be noted that on each side of the sealing vane 74 the inside face of the built up portion is flat conforming to the flat face of the lobe 67. Adjacent each of the terminal points 64, 65 is a pair of ports 75, 76 being arranged at the terminal point 64 and the ports 77, 78 adjacent to the terminal point 65. By a suitable valve arrangement which will be described later, the chamber 62 is alternately divided into a pressure chamber and a discharge chamber whereby the oscillating rotor 63 is caused to alternately oscillate between the terminal points 64, 65. It is to be noted that the ports 75, 78 are adjacent to the overlap into the built-up portion 73 while the ports 76, 77 are positioned so as to be located between the vanes 69, 70 when the rotor is positioned at either terminal end. The purpose of such a positioning is to decelerate the rotor. It is of advantage to undercut the ports 76, 77 towards the respective terminal ends as shown at 79 (see FIG. 8) to smooth out the deceleration. A driving connection between the oscillating rotor 63 and the extension 61 is established by interfeeding splines 80, 81 on the extension 61 and on the shaft bore 82 of the oscillating rotor 63.

INJECTION ASSEMBLY

The injection assembly comprises the fixed platen 90 and is mounted on the frame in a manner to be substantially immovable during operation on the machine. The fixed platen has a conventional small motion against spring reaction. This small motion is used to move the nozzle sufficient to open the vale 94a. This motion, however, is effected by the movement of the clamp end assembly hydraulically actuated base as previously described. It is to be noted that this motion does not occur until after the platens have closed. The mold cavity 55 is mounted on the front face thereof in the usual manner. The fixed platen 90 is mounted on the tie rods 21 by means of mounting hubs 91 of which there are four, one on each tie rod. The mounting hubs include adjusting means 92 by means of which the fixed platen can be squared relative to the movable platen. The fixed platen has extending rearwardly therefrom an injection cylinder 93 which has on its forward end an injection nozzle 94 in registration with the sprue 95 formed through the mold part 55. The injection cylinder 93 is supported in the matter hereinafter described. It is housed within barrel 96. This support is provided with a fine adjustment means (FIG. 12) to be described, by means of which the nozzle 94 may be adjusted, through 360°, to correctly align the tip of the nozzle with the inlet to the sprue passage 95. The fine adjustment is generally indicated by the reference numeral 180. FIG. 1 is shown in detail in FIG. 12.

Figures 11, 12:
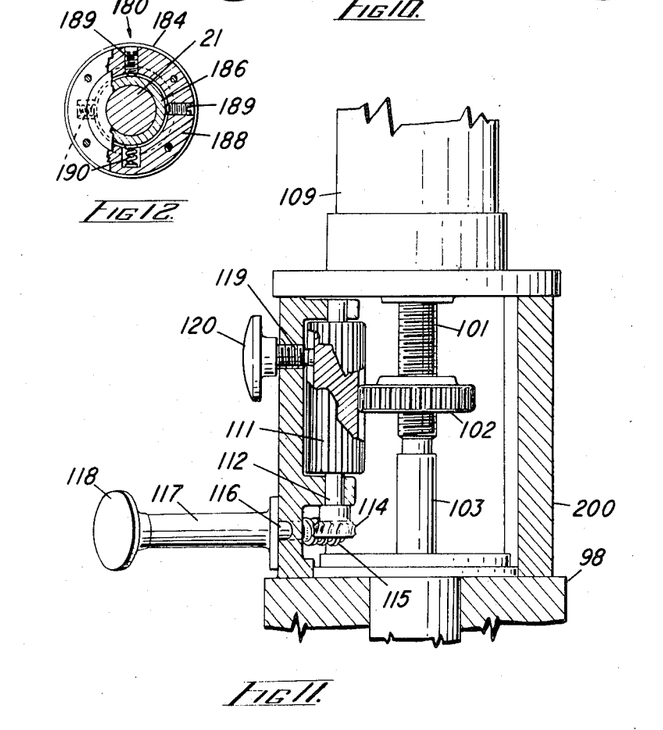
FIG. 11 is a cross sectional view on the line 11—11 of FIG. 10.
FIG. 12 is an enlarged view of the nozzle fine adjustment.

Reference is now made to FIGS. 1, 12, wherein the means for adjusting the nozzle 94 is illustrated. The adjusting means, generally indicated by the reference numeral 180, is mounted on a support 98 for the injection cylinder 93 and its related parts. The support 98 is in the form of an L-shaped crosshead having crossbeam 181 which is slidably mounted on the two top tie rods 21 by bearings 182, 183 respectively. An arm 184 is formed integrally with the crossbeam 181 and extends rearwardly therefrom at right angles thereto. The arm 184 is formed with a hollow center through which its respective tie rod 21 passes. The left-hand or forward end has the bearing 182 mounted therein while the right-hand or rear end is formed with an enlarged recess 185 to receive an adjustable bearing 186, which is coaxial with bearing 182. A collar 188 is attached to the end of the arm 184 about the bearing 186. The axial position of the bearing 186 in the collar 180 is adjusted by adjustment of two setscrews 189 which are set in the collar 188 radially about the axis thereof and 90° apart. A coil spring 190 is held in a recess in the collar 188 diametrically opposite to each screw 189.

The crosshead is also formed with a depending portion 196 which is formed with a central passage 197 therethrough, the passage being designed to be as nearly as possible coaxial with the sprue passage 94a. The housing 96 is supported by the depending portion 196 with the injection piston 103 extending through the central passage 197, the right end being supported by plate 198 which carries bushing 199.

It will now be apparent that by turning the screws 189 the position of the tip of the nozzle 94 can be adjusted to bring the tip and the inlet to the sprue passage 94a into accurate alignment. This provides the final fine adjustment which can be accomplished even with the machine in operation.

The depending portion 196 also carries a rearwardly extending bracket 200 which supports an hydraulic cylinder 99 coaxial with the injection cylinder. A piston 100 is mounted within the cylinder 99, the piston being provided with a stem 101 which extends towards the portion 196. The stem 101 is threaded and has mounted thereon an adjustable wheel 102 by means of which a finely adjusted charge of plastic material can be obtained as hereinafter described.

Mounted within the cylinder 93 is an injection piston 103 which has its left end contacting the end of the stem 101. The operation of the injection piston will be described in conjunction with the operation of the machine. Hydraulic fluid under pressure is admitted to the cylinder 99 through the conduit 104 to actuate the piston in one direction to drive the injection piston so as to inject plasticized material into the mold cavity. The hydraulic fluid is discharged through the conduit 104 when the piston moves in the opposite direction when the plasticized material is forced into the injection cylinder 93 for recharging the same as hereinafter described.

INJECTION PISTON ADJUSTMENT

To obtain an approximate position adjustment of the hydraulic cylinder 99 a cylinder adjustment screw is provided. This cylinder adjustment screw comprises a threaded shaft 105 which has its left-hand end rotatably connected to the head of the cylinder 99 by means of a connector 106 and its right-hand end threaded through a crosshead 107 which is firmly mounted on the tie rods 21. The shaft 105 extends beyond the crosshead and is mounted thereon a ball crank handwheel 108. The shaft 105 is held against rotating out of its adjusted position by means of a threaded bar 109 which is threaded into the hub of the crosshead at right angles to the threaded shaft to engage with the same. A hand knob 110 is mounted on the projecting end of the threaded bar 109 for hand operation.

Figure 10:
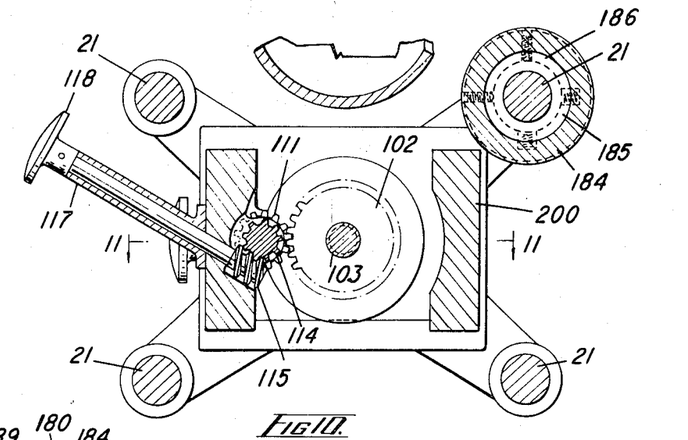
FIG. 10 is a cross section of the line 10—10 of FIG. 1 to shown the means for adjusting the stroke of the injection piston and thereby the amount of plasticized material which is injected into the mold at each shot.

The means for rotating the adjustable wheel 102 for the fine adjustment of the charge of plasticized material is shown partly in FIG. 1 with details of construction shown in FIGS. 10 and 11. Suitably mounted within the frame work and adjacent to the adjustable wheel 102 is a spline gear 111. It will be seen, from FIG. 11, that the spline gear 111 has its axis of rotation parallel to longitudinal axis of the piston stem 101. This permits the adjustable wheel 102 to move longitudinally relative to the spline 111. The shaft 112 of the spline gear 111 is extended beyond its support 113 and mounted thereon is a worm gear 114 which engages with the worm 115 carried on the end of a manually rotatable shaft 116 which is housed within a sleeve 117, the shaft being provided on its outside end with knob 118. A setscrew 119 is entered through the frame work and has its inside end reduced in diameter so as to engage between the splines on the spline gear 111 and its outer end is provided with a knob 120 for manual adjustment of the setscrew. This enables a fine adjustment of the charge while the machine is running.

FEED SCREW ASSEMBLY

The feed screw assembly and the drive therefor is shown in FIGS. 1, 2 and 3. The feed screw assembly comprises a feed screw 130 of conventional construction. The feed screw 130 is rotatably mounted in a tubular barrel 131 having as its forward end block 131a which is clamped to the left-hand end of the barrel 96. The barrel 131 and the left end of barrel 96 are firmly clamped together by a clamping ring 132 which in the present machine, is oval shaped. Clamping pressure is applied by a pressure screw 132a. The rear end of the barrel 131 is supported on the support member 98. In accordance with conventional practice, the barrel 131 and feed screw 130 are mounted at an incline relative to the frame with the incline being downwardly towards the nozzle end. The nozzle end of the barrel 131 communicates with the injection cylinder 93 through a passage 134 which passage has the usual check valve 135 to prevent reverse flow from the injection cylinder. The feed screw assembly is also provided with the usual hopper 136 for granular plastic material and means for heating the material to a liquid state.

The feed screw 130 is mounted in the barrel so as to be longitudinally slidable therein and reacting to the pressure differential between the pressurized material in the injection cylinder and the hydraulic pressure of the fluid which drives the hydraulic motor to stop and start the motor thereby controlling the feed of plasticized material into the injection cylinder. This novel arrangement is accomplished by the novel gear box construction shown in FIGS. 1, 2, 3 and 9.

HYDRAULIC DRIVE FOR THE FEED SCREW

Figure 9:
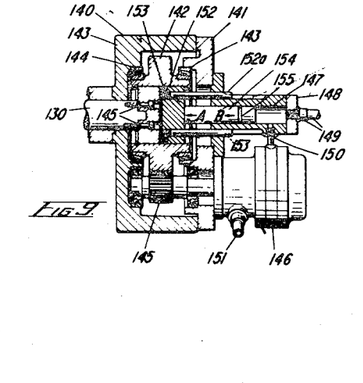
FIG. 9 is a vertical cross of the screw drive mechanism with automatic shutoff actuated by the displacement of the screw.

The hydraulic drive for the feed screw comprises a gear box 140 which is mounted to the right-hand end of the barrel 131. The gear box is provided with a removable cover 141. Mounted within the gear box coaxial with the feed screw 130 is a driven gear 142. The mounting for the gear 142 comprises roller bearings 143. The gear 142 is formed with a hollow central portion in which is mounted a plate 144 which is in driving connection with the gear 142 and is connected to the right-hand end of the shaft 130 by means of bolts 145. Mounted also within the gear box and in the present construction below the gear 142 and in engagement therewith is a driving pinion 145 which is driven by the hydraulic motor 146. Mounted on the cover 141 is an hydraulic cylinder 147 which has in its head 148 an inlet 149 and in the sidewalls thereof an outlet 150 which supplies hydraulic pressure fluid to drive the motor. The motor outlet 151 serves to return the spent hydraulic fluid to a reservoir for repressurizing.

The outlet 150 is opened and closed to start and stop the motor 146 by the following device.

Mounted with the hollow gear 142 between the plate 144 and the left-hand end of the hydraulic cylinder 147 is a nonrotatable thrust plate 152 mounted on pins 152a to reciprocate as herein described. The thrust plate 152 and the plate 144 are separated by thrust bearing 153. Mounted within the hydraulic cylinder 147 is a reciprocating piston valve 154 which carries a piston ring 155. Hydraulic pressure fluid which enters the hydraulic cylinder 147 through the inlet 149 acts on the piston 154 to move it in a direction indicated by the arrow A. This moves the whole assembly consisting of the feed screw 130, plate 144, thrust plate 152, and the related parts to the position shown in FIG. 9 in which position the hydraulic motor 146 will be energized to rotate pinion 145, pinion 142, plate 144 and the screw 130 to feed plasticize material into the injection cylinder 93 until a full charge of plasticize material is contained therein. As the cylinder fills the injection piston 103 will move to the right until the adjustable wheel engages against the left-hand end of the cylinder 99. When that occurs the pressure will build up by the rotating feed screw which will cause the feed screw to move to the right, such movement of the screw in the direction indicated by the arrow B will move the piston 154 to the right until it covers the outlet 150 which will automatically stop the motor 146 and the screw 130. When the injection pressure is released the pressure in the injection cylinder will drop below that of the hydraulic pressure fluid with the result that the piston valve 154 will be forced in the direction of the arrow A to again open the outlet 150 and restart the motor and feed screw. Shutoff will actually not occur with proper set up if cycle speed is high and injection volume per cycle is low.

OPERATION

The programming of the injection molding machine to carry out the sequence of the closing the platens, injecting plasticized material into the mold cavity by means of the injection piston, maintaining the necessary dwell time so that the article will retain its formed shape when rejected, opening the platens to eject the article and the speed of rotation of the feed screw to maintain a full charge in the injection cylinder are matters within the competence of the person skilled in the injection molding machine field. Consequently, it is not considered necessary to describe the construction and operation of a timing mechanism to carry out the sequence of operation of setting the proper programming of such operation.

Figure 13:
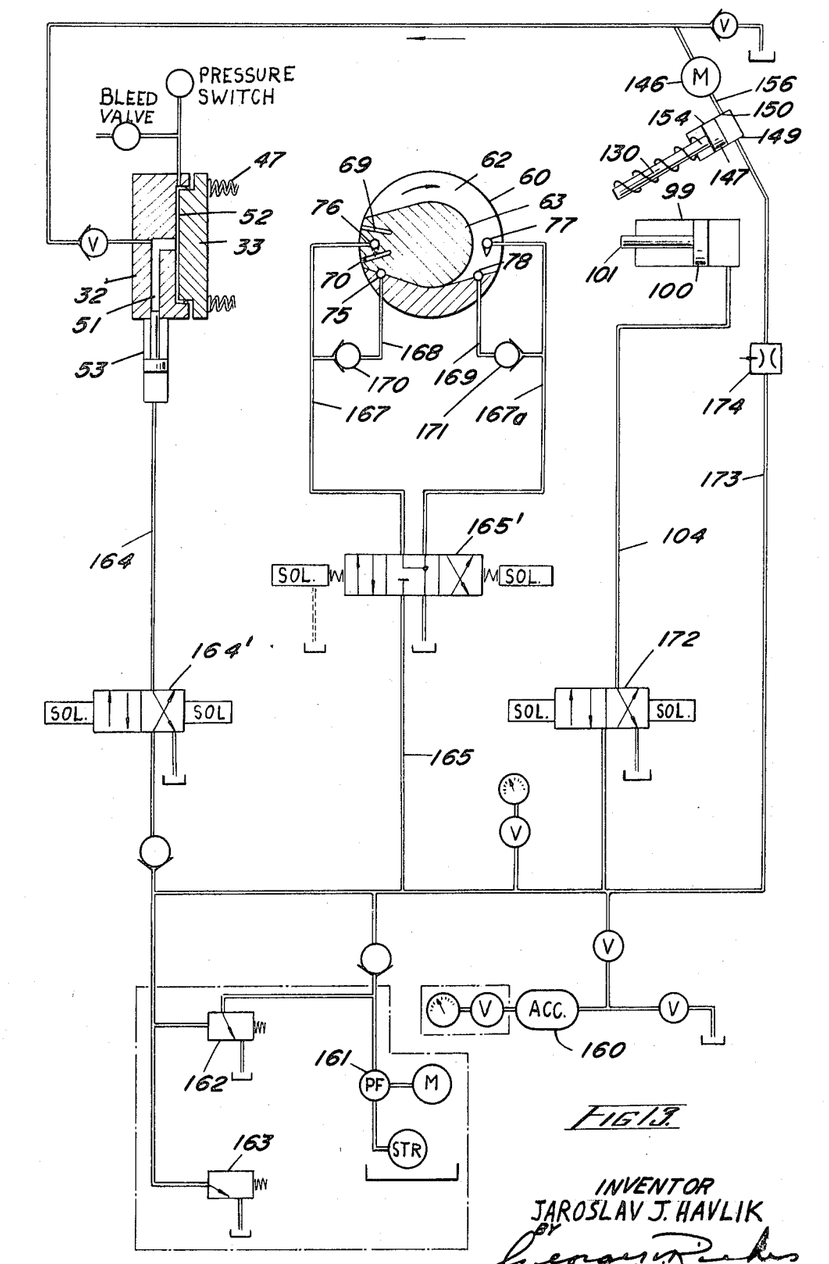
FIG. 13 is a schematic drawing of the control circuits.
Figure 14:
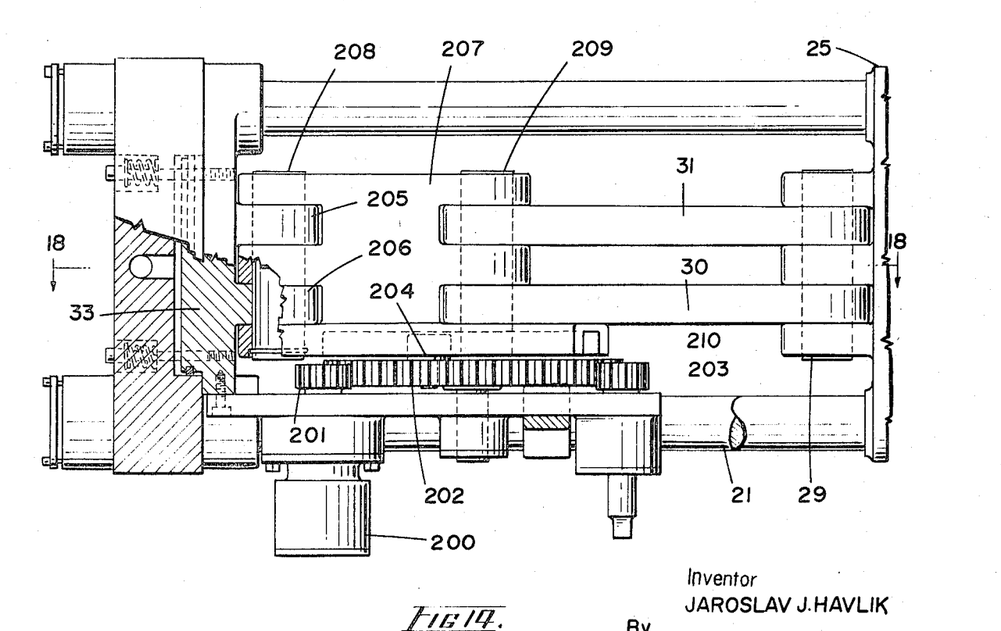
FIG. 14 is a fragmentary plan view, partly in cross section of the end of the machine which houses the drive mechanism and the hydraulically actuated base of the clamp assembly.
Figure 15:
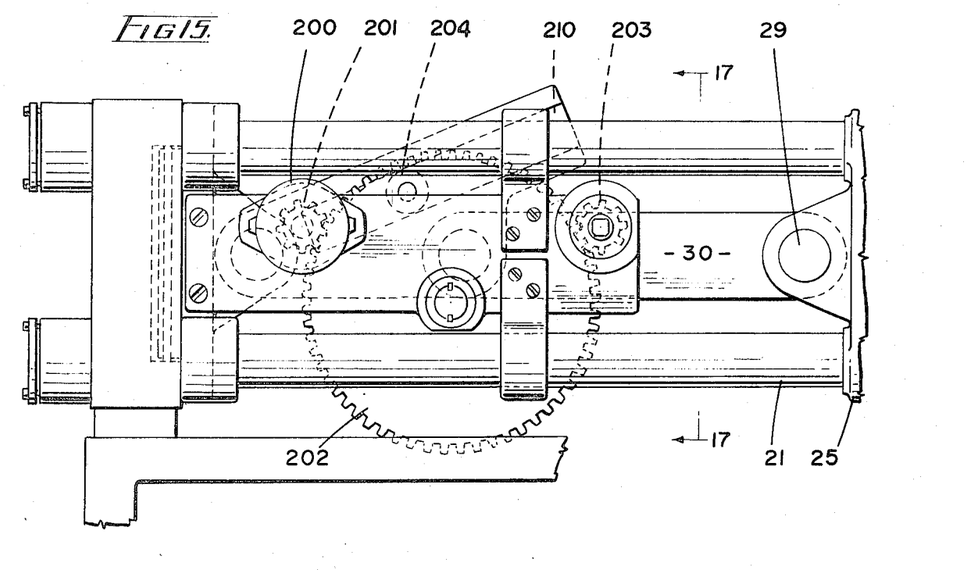
FIG. 15 is an elevation of the part shown in FIG. 14 with the mechanism in position when the platens are closed.
Figure 16:
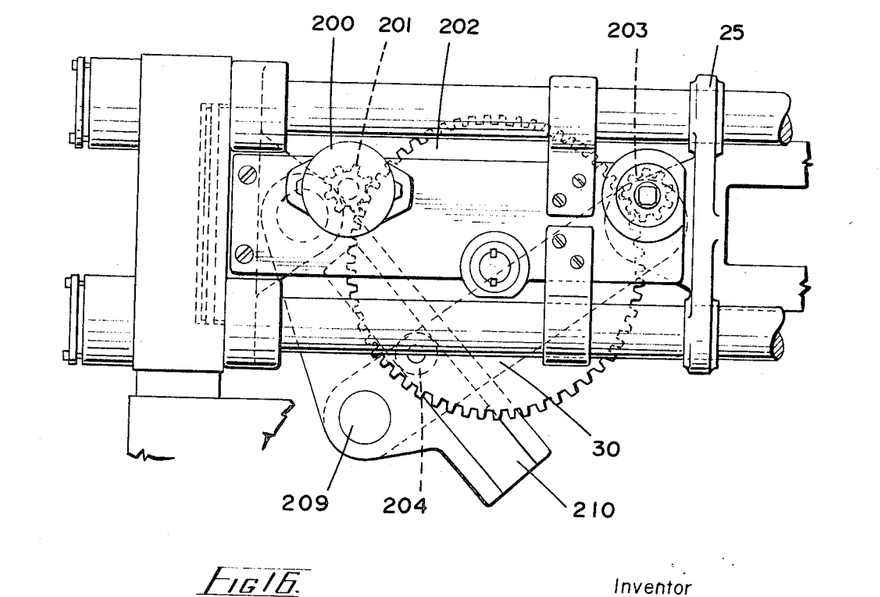
FIG. 16 is an elevation similar to FIG. 15 with the platens open.
Figure 17:
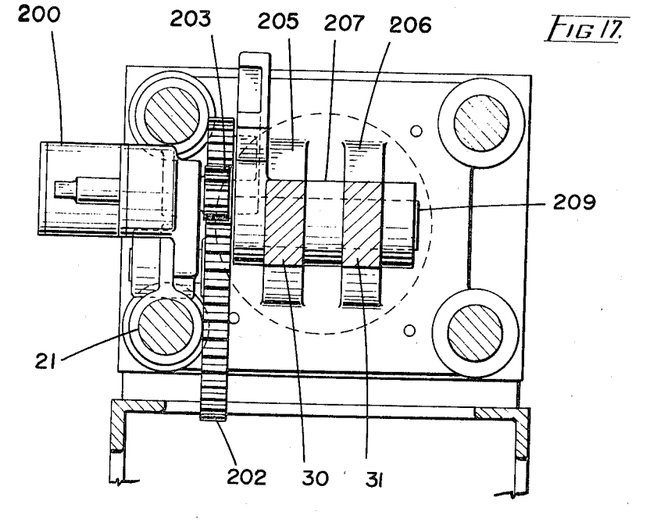
FIG. 17 is a cross section on the line 17—17 of FIG. 15.
Figure 18:
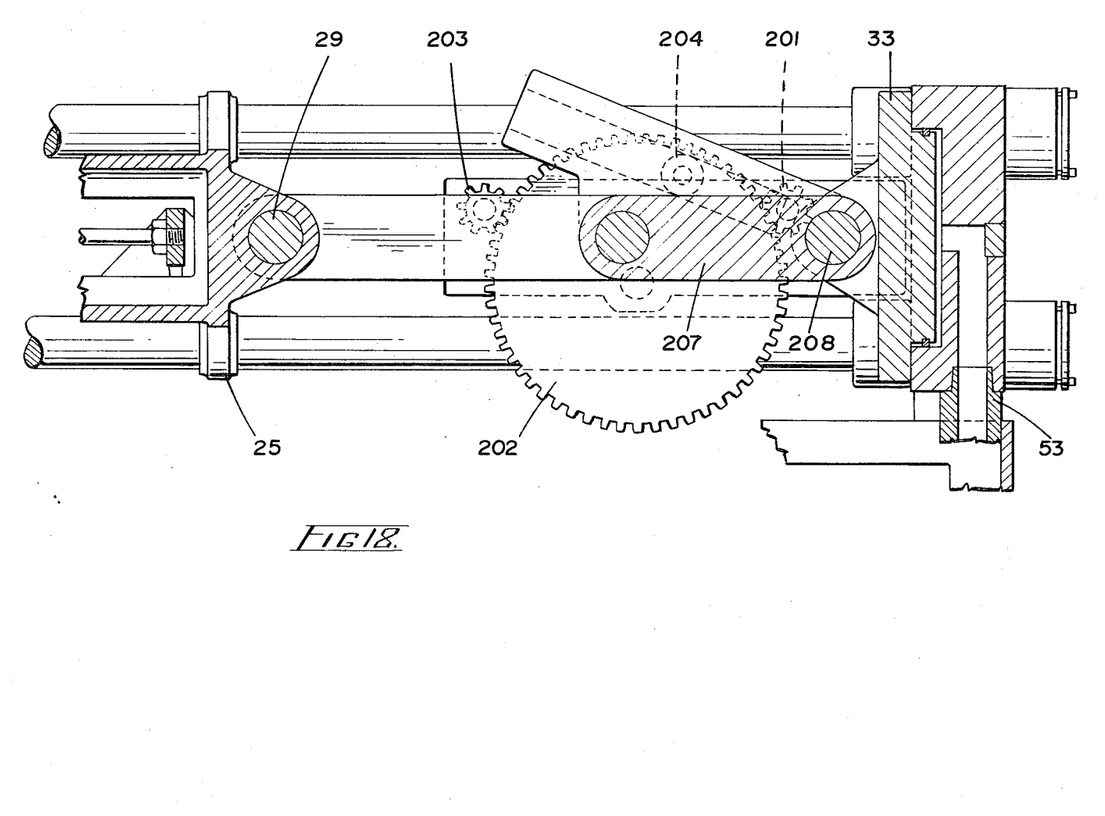
FIG. 18 is a cross section on the line 18—18 of FIG. 14.

Therefore in the schematic view shown in FIG. 13, there is shown only such parts as are necessary for explaining the operation of the hydraulic system. The hydraulic system indicated diagrammatically in FIG. 13 comprises a conventional source of hydraulic fluid pressure including an accumulator 160, a fixed displacement pump 161 and pressure control means 162, 163 by means of which the clamping pressure is adjusted within predesigned limits while the machine is operating.

The various hydraulically operated elements are each provided with a conduit system connecting it with the fluid pressure supply source as follows. The hydraulic system 53 is connected to the supply system by means of a conduit 164. Interposed in the conduit 164 is a solenoid valve 164' the operation of which is controlled by the sequence timing circuit. When the valve is open, fluid pressure is supplied to the hydraulic system 53 to actuate the base 33 as previously described. When pressure is so applied the clamp end assembly is moved to the right to thereby apply high clamping pressure between the movable platen and the fixed platen in the closed position.

The rotor assembly is supplied with fluid pressure through a conduit 165 and a solenoid valve 165' which has a main branch line 167 leading to the port 76 and which has a branch line 168 leading therefrom to the port 75; a second main branch line 167a leads from the solenoid valve 166 to the port 77 with a branch line 169 leading therefrom to the port 78. Check valves 170, 171 in the branch lines 168, 169 respectively allow fluid to flow into the rotor but prevent reverse flow. When the rotor 63 is in the position shown in FIG. 13 it is ready to be oscillated to the diametrically opposite position when the timing mechanism actuates the solenoid valve to send hydraulic fluid pressure through the main branch line 167. Fluid pressure will first be admitted through the branch line 168 through the port 75 to start the rotor 63 moving in the direction of the arrow. When the vane 70 passes the port 76 this port becomes usefully available in addition to the port 75 for hydraulic fluid flow to provide a full flow to quickly accelerate the rotor. As the rotor 63 continues its motion in the direction of the arrow the hydraulic fluid which is in the chamber 62 will be forced out the port 77 through the main line 167a. When the vane 69 crosses the port 77, escape of hydraulic fluid from the chamber between ports 77 and 78 will be prevented except through the narrowing channel 79a. By this means the rotor 63 is prevented from coming to a jarring stop as port 77 is isolated. When the direction of travel of the rotor is reversed, port 79 acts to start the motion of the rotor 63 in the anticlockwise direction of its travel as viewed in FIGS. 6 or 13.

The narrowing channels 79, 79a and valves 170, 171, may, if so desired, be replaced entirely or supplemented by adjustable needle valves for bleeding off hydraulic fluid trapped in the rotor chamber after the vanes pass ports 76, 77.

The rotor 63 is oscillated from its clockwise position to the position shown in FIG. 13 by the solenoid valve closing the conduit 167 and admitting fluid into the conduit 169 and through the ports 77, 78.

The hydraulic cylinder 99 is connected to the hydraulic supply by the conduit line 104 which includes a solenoid valve 172. The solenoid valve 172 is controlled by the timing mechanism which will open the same at the programmed time to admit hydraulic fluid to the hydraulic cylinder 99 and actuate the piston 100 which has its stem 101 in continuous engagement with the injection piston 103. There is thus no lost motion when the hydraulic fluid under the required pressure is admitted to the hydraulic cylinder to force a charge of plasticized material into the mold cavity. The conduit 173 with regulator valve 174 communicates with the inlet 149 of the cylinder head 148 of the hydraulic cylinder 147 for supplying hydraulic fluid for running the hydraulic motor 146 and for the actuation of the piston 154. The conduit line 173 is not controlled by a solenoid valve since the operation of the hydraulic motor 146 is automatically controlled by the movement of the feed screw 130 as previously explained.

The drive mechanism described in detail on pages 9 and 10 with reference, in particular, to FIGS. 6 and 7 may be replaced by the drive mechanism herein described and illustrated with reference to FIGS. 14 to 18 inclusive.

The drive mechanism illustrated in FIGS. 14 to 18 inclusive comprises an hydraulic motor 200 which is mounted on the frame adjacent to the base 33. The motor has sufficient power only to open and close the platens as it takes not part in the pressure clamping of the plates in the closed position. The motor 200 is provided with a small gear wheel 201 which meshes with a large diameter driven gear wheel 202. There is also provided an idler gear 203 which meshes with gear wheel 202.

The gear wheel 202 is provided with a driving pin 204 projecting downwardly from the side face adjacent the rim. The base 33 is provided with outwardly projecting mounting brackets 205, 206. A toggle arm 207 has one end pivotally connected to the brackets 205, 206 by a pivot pin 208 with its other end pivotally connected to the adjacent ends of arms 30, 31 by pivot pin 209. It will be noted that in the closed position the pins 29, 209 and 208 are located in a straight line.

The toggle arm 207 is provided with a guide way 210 in which the pin 204 slides. It will thus be seen that when the gear wheel 202 is rotated the pin will cause the toggle arm 207 to be actuated and thus open and close the platens.

The machine will operate in the same manner as the one shown in the principal disclosure. The schematic drawing of the control circuits shown in FIG. 13 will, or course, be modified to accommodate to the drive mechanism illustrated. The hydraulic motor can be operated continuously since the large gear wheel 202 will provide a sufficient dwell period in the open position to allow for cooling and ejection of a mold article and in the closed position for molding. The present machine can mold about 30 articles a minute.

What I claim is:

1. An injection molding machine comprising:
   a. a frame assembly,
   b. a stationary platen and a movable platen mounted on said frame and having mountable thereon a mold divided into two separable sections, one section being mounted on the stationary platen and the other mounted on the movable platen,
   c. a drive mechanism operatively connected to the movable platen to open and close said mold,
   d. said drive mechanism being supported by an hydraulically actuatable base having limited reciprocating movement,
   e. means admitting pressure fluid to said base after said platens are closed to thereby apply high clamping pressure thereto during the injection of molding material into said mold and releasing said pressure before said platens open, the said drive mechanism for opening and closing the mold comprising:
   f. a cylindrical housing having approximately diametrically opposite ports through which pressurized fluid is admitted and discharged,
   g. a drive shaft mounted axially in said housing,
   h. a fluid-pressure-actuated oscillating rotor mounted on said shaft within said housing with a driving connection between the rotor and the shaft, said rotor being oscillatable between two substantially diametrically opposite terminal positions,
   i. an eccentric crosshead mounted on and actuated by said shaft, said crosshead reactively engaging against said base, and
   j. a connecting rod eccentrically connected to the crosshead and to the movable platen.

2. An injection molding machine according to claim 1 wherein:
   the cylindrical housing has two pairs of approximately diametrically opposite ports through which the pressurized fluid is admitted and discharged, and the fluid pressure actuated rotor is provided with a pair of spaced radial vanes,
   mounted in said rotor and in sealing engagement with the interior wall of the housing;
   one port of each pair being located slightly beyond a terminal position of the said vanes and the other port of each pair being located to lie between said vanes when the rotor is positioned at either terminal position towards which the rotor is approaching whereby the port is closed shortly before the rotor reaches said terminal position, and means to release the fluid trapped beyond the closed port to thereby decelerate the rotor and permit it to move to its terminal position.

3. An injection molding machine according to claim 1 in which the crosshead is wheel-shaped and rests in an arcuate recess formed in the actuatable base, said wheel reacting to said base, and the connecting rod is eccentrically connected to the said wheel and to the movable platen.

4. An injection molding machine according to claim 1 in which the driving mechanism includes means mounting said rotor and crosshead for limited movement transverse to their axis of rotation permitting said engagement.

5. An injection molding machine according to claim 1 in which:
   k. the cylindrical housing has two pairs of approximately diametrically opposite ports through which a pressurized fluid is admitted and discharged,
   l. a pair of spaced radial vanes, mounted in said rotor and in sealing engagement with the interior walls of the housing, one port of each pair being located slightly beyond the respective terminal position of the said vanes and the other port of each pair being located to lie between said vanes when the rotor is positioned at either terminal position towards which the rotor is approaching whereby the port is closed shortly before the rotor reaches its terminal position to thereby decelerate the rotor.

6. An injection molding machine according to claim 1 in which the drive is journaled in resiliently mounted bearings to permit limited movement of the crosshead transverse to its axis of rotation during closing of the platens.

7. An injection molding machine according to claim 6 the additional element consisting of means to adjust the tension of the resistance of the mounting to movement during closing of the platens.

8. An injection molding machine according to claim 1 including means operable while the machine is operating to adjust the clamping pressure within predesigned limits.

9. In an injection molding machine having a frame assembly; a stationary platen and a movable platen mounted on said frame and having mountable thereon a mold divided into two separable sections, one section being mounted on the stationary platen and the other mounted on the movable platen; a drive mechanism operatively connected to the movable platen to open and close said mold to perform a molding operation; an injection nozzle and an injection piston operable in a cylinder containing plasticized material for injecting plasticized material into the mold when the platens are closed, the invention herein defined comprising:
   a. a cylindrically shaped plasticizing chamber having at one end an outlet in constant communication with said cylinder and at the other end a fluid pressure chamber;
   b. a feed screw housed in the plasticized chamber for forcing the plasticized material into said cylinder under pressure;
   c. a pistonlike mounting for said screw in said pressure chamber permitting said screw to move longitudinally in either direction in response to pressure differentials;
   d. a fluid pressure motor having a driving connection with said screw;
   e. the pressure fluid chamber having an inlet communicating with a source of hydraulic pressure fluid and an outlet port communicating with the said motor;
   f. said mounting reacting to a pressure differential between the pressurized material in the injection cylinder and the hydraulic pressure fluid which drives the motor to open and close said outlet port to thereby automatically start and stop said motor.

11. In an injection molding machine according to claim 9 including a second pressure chamber coaxial with the injection piston, a reciprocatable piston mounted in said second pressure chamber, said piston having a member in constant engagement with the injection piston, said reciprocatable piston being responsive to the pressure differential between the plasticized material in the cylinder and the fluid pressure in the chamber to move axially in either direction, whereby when the platens are closed the injection piston reacts, without lost motion, to the reciprocatable piston and its member to move in a direction to inject plasticized material into the mold and when the platens open the said pistons move in the opposite direction permitting the injection cylinder to be recharged with plasticized material by said feed screw.

11. In an injection molding machine having a frame assembly; a stationary platen and a movable platen mounted on said frame and having mountable thereon a mold divided into two separable sections, one section being mounted on the stationary platen and the other mounted on the movable platen; a drive mechanism operatively connected to the movable platen to open and close said mold to perform a molding operation; an injection nozzle having its tip registrable with a sprue inlet formed in said stationary platen, and an injection piston operable in an injection cylinder containing plasticized plastic material for feeding said material into the mold when the platens are closed; actuating means reciprocating said piston for carrying out an injection cycle; adjustable stop means to limit the stroke of said injection piston and a stop adjusting member carried by the frame engaging said stop means whereby the amount of the plastic material to be injected into the mold is regulated to the required amount while the injection molding machine is in operation, said adjustable stop means comprising:

a. a second cylinder coaxial with the injection cylinder;
b. a reciprocatable piston mounted in said second cylinder, said reciprocatable piston having a projecting extension coaxial to and engaging with a projecting extension on the injection piston;
c. the said adjustable stop means is threadedly mounted on one of said extensions, said stop means being engaged by a fixed stop member carried on the frame when said injection cylinder has been filled with a predetermined amount of said material; and
d. said stop adjusting member, engaging with adjustable stop means and operable while the machine is in operation for adjusting the position of the adjustable stop means relative to the fixed stop whereby the predetermined amount of said material is altered.

12. In an injection molding machine having a frame assembly; a stationary platen and a movable platen mounted on said frame and having mountable thereon a mold divided into two separable sections, one section being mounted on the stationary platen and the other mounted on the movable platen; a drive mechanism operatively connected to the movable platen to open and close said mold to perform a molding operation; an injection nozzle having its tip registrable with a sprue inlet formed in said stationary platen, and an injection piston operable in an injection cylinder containing plasticized plastic material for feeding said material into the mold when the platens are closed; actuating means reciprocating said piston for carrying out an injection cycle; adjustable stop means carried by the actuating means to limit the stroke of said injection piston and a stop adjusting member carried by the frame engaging said stop means whereby the amount of the plastic material to be injected into the mold is regulated to the required amount while the injection molding machine is in operation, said adjustable stop means comprising:

a. a hydraulic cylinder coaxial with the injection cylinder;
b. a hydraulic piston mounted in said hydraulic cylinder, said piston having a stem coaxial with the injection piston and having a threaded extension which engages with a projecting free end of the injection piston;
c. the said adjustable stop means being carried by the threaded extension, said stop means being engaged by a fixed stop member carried on the frame when said injection cylinder has been filled with a predetermined amount of said material;
d. an adjusting member, engaging with adjustable stop means and operable while the machine is in operation for adjusting the position of the adjustable stop means relative to the fixed stop whereby the predetermined amount of said material is altered.

13. In an injection molding machine according to claim 12 in which said adjustable stop means comprises a gear wheel and the adjusting member comprises a spline gear with which said gear meshes without interfering with the reciprocating movement of the threaded extension, and means for rotating said spline gear whereby said spline gear rotates said gear to adjust the position of the gear wheel relative to the fixed stop and means locking said spline gear against movement out of the adjusted position.

* * * * *